US012810884B2

(12) United States Patent
da Fonte Lopes da Silva et al.

(10) Patent No.: US 12,810,884 B2
(45) Date of Patent: Nov. 24, 2026

(54) NOISE REMOVAL ON AN ELECTRONIC DEVICE

(71) Applicant: Hewlett-Packard Development Company, L.P., Spring, TX (US)

(72) Inventors: Andre da Fonte Lopes da Silva, Palo Alto, CA (US); Carol Tatsuko Ozaki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 88 days.

(21) Appl. No.: 18/571,583

(22) PCT Filed: Jun. 29, 2021

(86) PCT No.: PCT/US2021/039662

§ 371 (c)(1),
(2) Date: Dec. 18, 2023

(87) PCT Pub. No.: WO2023/277886

PCT Pub. Date: Jan. 5, 2023

(65) Prior Publication Data

US 2024/0282324 A1 Aug. 22, 2024

(51) Int. Cl.

| | |
|---|---|
| ***G10L 21/0208*** | (2013.01) |
| ***G06F 3/16*** | (2006.01) |
| ***G06V 20/40*** | (2022.01) |
| ***G10L 25/57*** | (2013.01) |
| ***G10L 25/84*** | (2013.01) |
| ***H04L 65/1069*** | (2022.01) |
| ***H04L 65/1089*** | (2022.01) |
| ***H04M 3/56*** | (2006.01) |

(52) U.S. Cl.

CPC .......... *G10L 21/0208* (2013.01); *G06F 3/162* (2013.01); *G06V 20/41* (2022.01); *G10L 25/57* (2013.01); *G10L 25/84* (2013.01); *H04L 65/1069* (2013.01); *H04L 65/1089* (2013.01); *H04M 3/568* (2013.01)

(58) Field of Classification Search

CPC ............ H04L 65/1089; H04L 65/1069; H04M 3/568; G06V 10/30; G06V 20/41; G10L 21/0208; G10L 25/57; G10L 25/84; G10L 25/78; G10L 17/22; G06F 3/162; G06F 3/165

USPC .......................................................... 704/226

See application file for complete search history.

(56) References Cited

U.S. PATENT DOCUMENTS

| | | | |
|---|---|---|---|
| 2010/0260074 | A1 | 10/2010 | Blouin et al. |
| 2018/0061437 | A1 | 3/2018 | Kay et al. |
| 2020/0219493 | A1 | 7/2020 | Li et al. |

FOREIGN PATENT DOCUMENTS

| | | | | |
|---|---|---|---|---|
| EP | 1214799 B1 | * 12/2008 | | H04Q 11/04 |
| JP | 2013142903 A | * 7/2013 | | G10L 17/22 |
| WO | 2017/112240 A1 | 6/2017 | | |

* cited by examiner

*Primary Examiner* — Md S Elahee

(74) *Attorney, Agent, or Firm* — Quarles & Brady LLP

(57) ABSTRACT

In some examples, a method includes initiating an audio session. In some examples, the method includes receiving a classification for the audio session. In some examples, the method includes automatically enabling inbound noise removal when the classification is voice.

20 Claims, 5 Drawing Sheets

NOISE REMOVAL ON AN ELECTRONIC DEVICE

BACKGROUND

The use of electronic devices has expanded. Some electronic devices include electronic circuitry for performing processing. As processing capabilities have expanded, electronic devices have been utilized to perform more functions. For example, a variety of electronic devices are used for work, communication, and entertainment. Electronic devices may be linked to other devices and may communicate with other devices.

DETAILED DESCRIPTION

Inbound noise removal is the process to remove unwanted noise from an inbound audio stream. In some examples, inbound noise removal may be used with online conference applications to attempt to remove distracting sounds or frequencies during an online call.

As explained more fully below, inbound noise removal is the removal of noise from an audio signal, where the audio signal was created, acquired and/or generated at another electronic device. As an example, a remote electronic device may record a voice and then may send this recorded voice audio signal to a local electronic device. When the local electronic device attempts to remove noise from this recorded audio signal from the remote electronic device, this may be referred to as inbound noise removal. In some examples, noise removal may also be referred to as noise cancellation. When the local electronic device records audio and then attempts to remove noise from this locally recorded or locally acquired audio signal, this may be referred to as outbound noise removal.

In some examples, inbound noise removal may be enabled or disabled by a user. When the user enables or disables inbound noise removal, it may lead to a poor user experience. For example, when the device is rendering audio content but not as expected, the user may wish to manually disable inbound noise removal. In another example, the user may join a conference call with inbound noise removal disabled. If the conference call has poor quality because of noise with the inbound audio, then the user may need to manually enable inbound noise removal.

Having inbound noise removal enabled while playing music or videos may degrade the audio being rendered by the device because it may actually remove sounds that were intended to be part of the audio. For example, inbound noise removal enabled during a movie or video may remove musical instruments playing, sound effects, etc.

Figure 1:
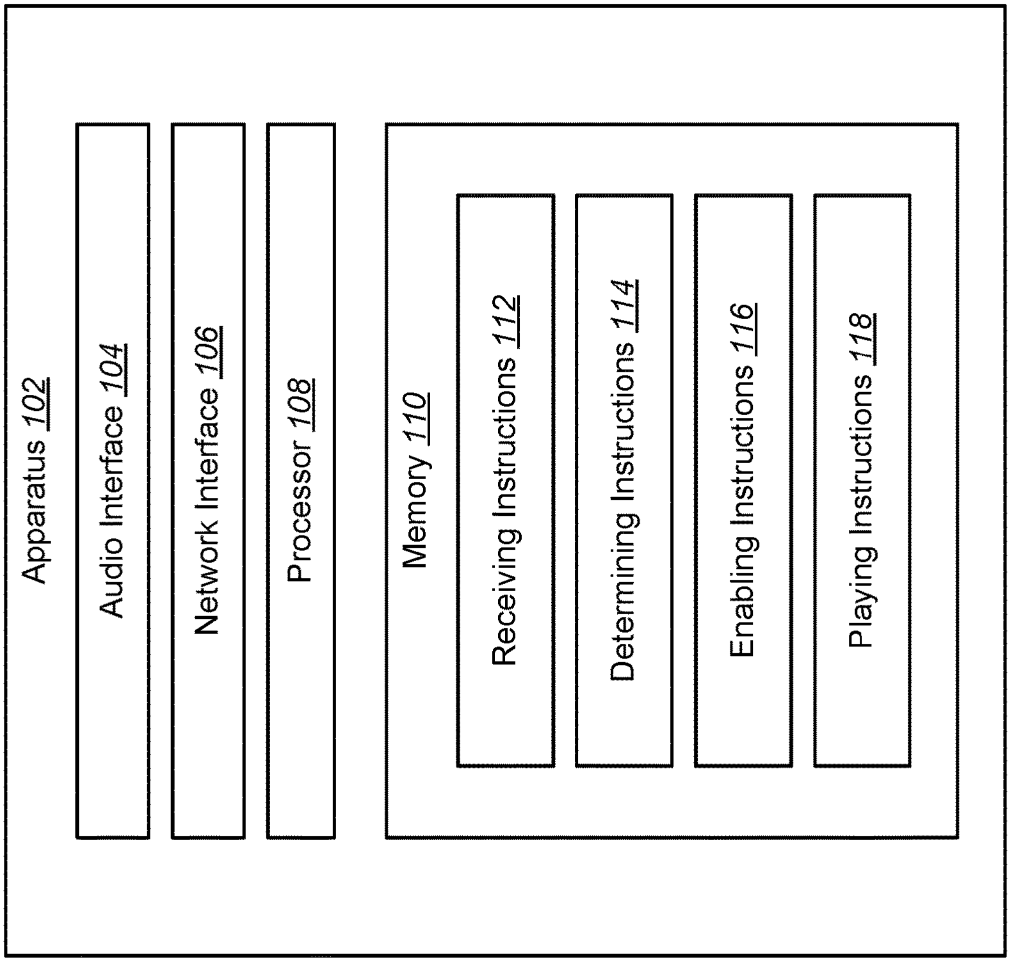
FIG. 1 is a block diagram illustrating an example of an apparatus for noise removal on an electronic device.

FIG. 1 is a block diagram of an example of an apparatus 102 that may perform inbound noise removal. The apparatus 102 may include an audio interface 104 to play audio on an audio output device. The apparatus 102 may include a network interface 106 to communicate over a computer network with computing devices. The apparatus 102 may also include a processor 108 to execute instructions stored in the memory 110.

The memory 110 may store instructions to be executed by the processor 108. Receiving instructions 112 receive audio from the network interface 106. In some examples, the audio may be received from a remote computing device via a computer network. Determining instructions 114 may determine a type for the received audio. In some examples, the type may be voice or not voice. In one example, voice may be when the received audio is a call or virtual meeting where the participants are speaking. If the determining instructions 114 determine that the received audio is not part of a call or virtual meeting, then the received audio may be set to not voice. If the type of received audio is determined to be not voice, it may be further classified as music or video. Enabling instructions 116 may automatically enable inbound noise removal for the received audio when the type determined is voice. Playing instructions 118 may play the audio after noise removal using the audio interface 104. In some examples, the playing instructions 118 may play the audio after noise removal to the user through an audio interface 104 such as a speaker port, headphone jack, a Bluetooth® wireless audio connection, etc.

Figure 2:
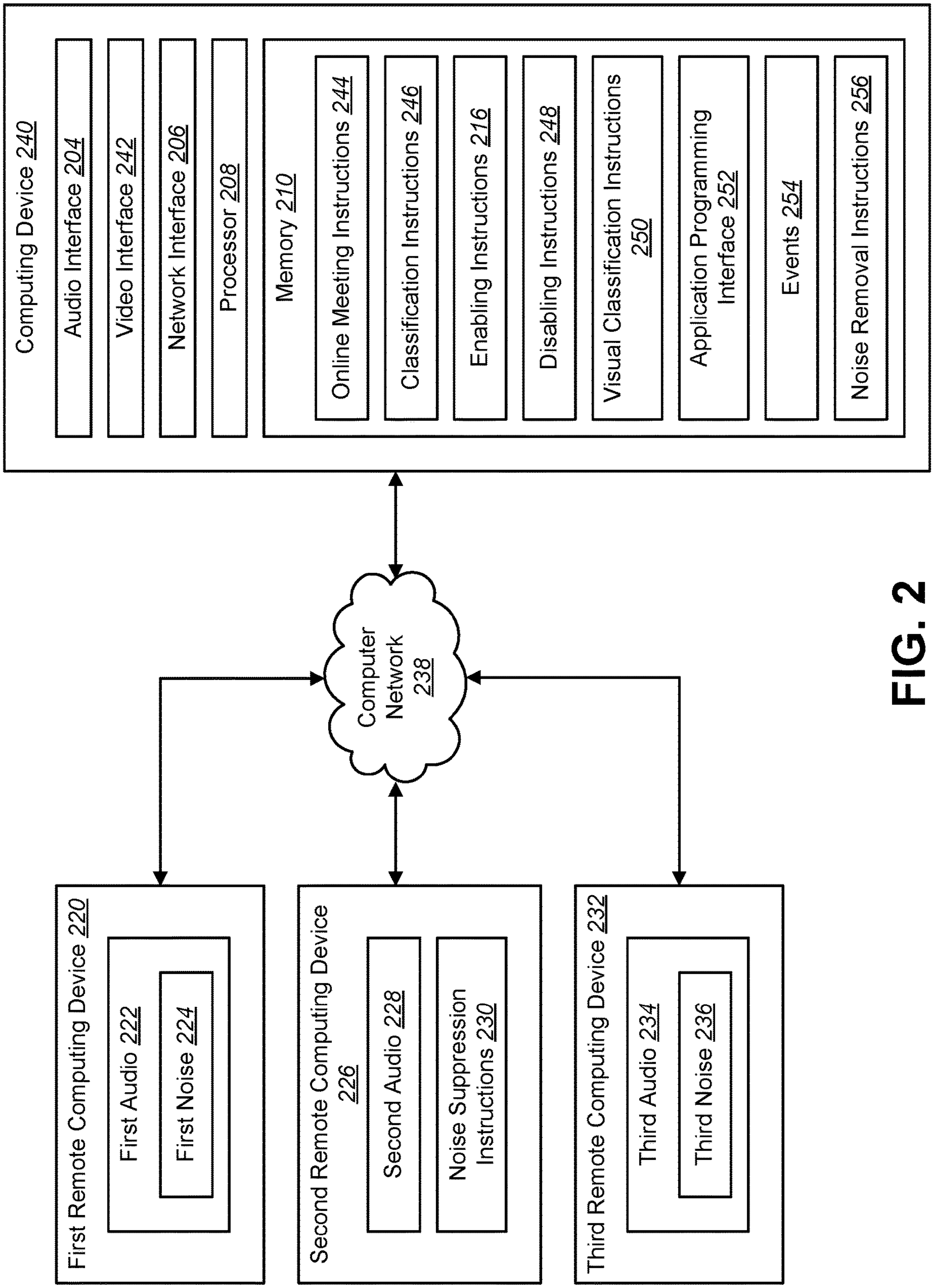
FIG. 2 is a block diagram illustrating an example of a computing device for noise removal on an electronic device.

FIG. 2 is a block diagram of an example of a computing device 240 that may perform inbound noise removal. A computing device 240 is an electronic device that includes electronic circuitry (e.g., integrated circuitry, a chip(s), etc.). Examples of electronic devices may include computers, smartphones, tablet devices, game consoles, etc. Some examples of electronic devices may utilize circuitry (e.g., controller(s) and/or processor(s), etc.) to perform an operation or operations. In some examples, electronic devices may execute instructions stored in memory 210 to perform the operation(s). Instructions may be code and/or programming that specifies functionality or operation of the circuitry. In some examples, instructions may be stored in memory 210 (e.g., Read-Only Memory (ROM), Erasable Programmable Read-Only Memory (EPROM), Electrically Erasable Programmable Read-Only Memory (EEPROM), flash memory, dynamic random access memory (DRAM), synchronous DRAM (SDRAM), magnetoresistive random-access memory (MRAM), phase-change random-access memory (PCRAM), hard disk drive (HDD), solid state drive (SSD), optical drive, etc.). In some examples, different circuitries in an electronic device may store and/or utilize separate instructions for operation.

The computing device 240 may include a processor 208, memory 210, an audio interface 204, a video interface 242, and/or a network interface 206. A computing device 240 may include additional components (not shown) and/or some of the components described herein may be removed and/or modified without departing from the scope of this disclosure.

The processor 208 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions stored in the memory 210. The processor 208 may fetch, decode, and/or execute instructions stored in the memory 210. In some examples, the processor 208 may include an electronic circuit or circuits that include electronic components for performing a function or functions of the instructions. In some examples, the processor 208 may perform one, some, or all of the operations, aspects, etc., described in connection with one, some, or all of FIGS. 1-5. For example, the memory 210 may store instructions for one, some, or all of the operations, aspects, etc., described in relation to one, some, or all of FIGS. 1-5.

The memory 210 may be any electronic, magnetic, optical, or other physical storage device that contains or stores electronic information (e.g., instructions and/or data). The memory 210 may be, for example, Random-Access Memory (RAM), Electrically Erasable Programmable Read-Only Memory (EEPROM), a storage device, an optical disc, and/or the like. In some examples, the memory 210 may be volatile and/or non-volatile memory, such as Dynamic Random-Access Memory (DRAM), EEPROM, magnetoresistive random-access memory (MRAM), phase change RAM (PCRAM), memristor, flash memory, and/or the like. In some implementations, the memory 210 may be a non-transitory tangible machine-readable storage medium, where the term "non-transitory" does not encompass transitory propagating signals. In some examples, the memory 210 may include multiple devices (e.g., a RAM card and a solid-state drive (SSD)). In some examples, the memory 210 of the computing device 240 may store instructions as shown.

Inbound noise removal may be the removal of noise in an audio signal that is received from a remote computing device 220 or other far-end device. When one local device is in communications with another device that is remote, the remote device may be referred to as a far-end device and the local device may be referred to as a near-end device. In some examples, the computing device 240 may be participating in an online meeting with a remote computing device 220. The first remote computing device 220 generates or acquires first audio 222 that may include first noise 224. The first audio 222 is sent to the computing device 240 over the computer network 238. When the computing device 240 enables inbound noise removal instructions 256 to remove the first noise 224 from the first audio 222, this may be referred to as inbound noise removal. In inbound noise removal, a device 240 attempts to remove noise from an audio signal that it is receiving from a remote computing device 220 or from a far-end device.

In some examples of an online call, the computing device 240 may be referred to as the near end, and the first remote computing device 220 may be referred to as the far end. In such an example, inbound noise removal instructions 256 attempt to remove the first noise 224 from the first audio 222, that may also be referred to as the far-end audio. Audio captured, acquired, or generated locally at the computing device 240 may be referred to as near end audio.

In contrast to inbound noise removal, outbound noise removal is when a particular computing device 226 captures or otherwise generates an audio signal and then the device itself 226 attempts to remove the noise at the computing device 226 before sending it to any other computing devices. An example of outbound noise removal is shown with respect to the second remote computing device 226. The second remote computing device 226 captures or generates second audio 228. The second remote computing device 226 includes noise suppression instructions 230 that are executed to remove any noise from the second audio 228. In this example, the second remote computing device 226 has performed outbound noise removal on the second audio 228 before it sends the second audio 228 out over the computer network 238. In this example, the computing device 240 may not need to perform inbound noise removal for the second audio 228 because the second remote computing device 226 had noise suppression instructions 230 that had already attempted to remove any noise from the second audio 228.

A third remote computing device 232 is shown. The third remote computing device 232 generates or captures third audio 234 that includes third noise 236. The third remote computing device 232 does not include noise suppression instructions 230 and, as a result, third noise 236 is present in the third audio 234. In some examples, the first audio 222, second audio 228, and third audio 234 may be audio streams being used as part of an online meeting.

In some examples, the computing device 240 may include a network interface 206 through which the processor 208 may communicate with an external device or devices (e.g., remote device(s)). For example, the network interface 206 may be a network interface device to establish wireless or wired communication on a network. In some examples, the computing device 240 may be in communication with (e.g., have a communication link with) a remote computing device via a network. Examples of remote computing devices may include computing devices, server computers, desktop computers, laptop computers, smartphones, tablet devices, game consoles, etc. Examples of the network may include a local area network (LAN), wide area network (WAN), the Internet, cellular network, Long Term Evolution (LTE) network, 5G network, and/or combinations thereof, etc.

In some examples, the remote computing devices 220, 226, 232 may be on a different local network than the computing device 240. In some examples, the remote computing devices 220, 226, 232 may communicate with the computing device 240 over an internet connection. The first remote computing device 220, second remote computing device 226, and third remote computing device 232 may be on the same local area network or on separate local area networks.

In some examples, a computing device 240 may be linked to another electronic device or devices using a wired link. For example, an electronic device (e.g., display device, monitor, television, etc.) may include a wired communication interface (e.g., connector or connectors) for connecting electronic devices. Connectors are structures that enable forming a physical and/or electrical connection. For instance, a connector may be a port, plug, and/or electrical interface, etc. A connector or connectors may allow electronic devices to be connected with a cable or cables. Examples of connectors include DisplayPort™ (DP) connectors, High-Definition Multimedia Interface (HDMI®) connectors, Universal Serial Bus (USB) connectors, Lightning® connectors, Digital Visual Interface (DVI) connectors, OCuLink connectors, Ethernet connectors, etc.

In some examples, a computing device 240 may be linked to an audio output device with an audio interface 204 to play audio on the audio output device. In some examples, an audio output device may be a speaker, a smart speaker, an audio receiver, a television, a monitor, etc. The audio output device is an electronic device capable of producing audible sound.

An audio interface 204 may be a wired or wireless link. Examples of a wired audio interface 204 include a speaker jack and/or a headphone jack on the computing device 240. The audio interface 204 may also be a wireless link. An example of a wireless audio interface 204 is a Bluetooth® interface.

A link between an electronic device and an audio output device may be a direct link (e.g., without an intervening device) or an indirect link (e.g., with an intervening device or devices). For instance, a link may be established between electronic devices over a network using a hub(s), repeater(s), splitter(s), router(s), and/or switch(es), etc.

The computing device 240 may include a video interface 242 for connecting the computing device 240 to a video output device, such as a computer monitor or television.

The memory 210 may include online meeting instructions 244. Online meeting instructions 244, when executed, cause the computing device 240 to start, join, or otherwise participate in virtual meetings, online calls, online conference calls, etc. Online meeting instructions 244 may include audio and/or video as part of the online meeting. Examples of online meeting instructions 244 include the Zoom® conferencing application, the Microsoft® Teams conferencing application, the Webex® conferencing application, the Google® Meet conferencing application, the GoToMeeting application, the BlueJeans® conferencing application, etc.

The memory 210 may include classification instructions 246. The classification instructions 246 may classify audio as either voice or not voice. Furthermore, the classification instructions 246 may classify audio that is not voice as music or video. Classification instructions 246 may classify the audio based on the metadata (number of audio channels, sample rate, bit resolution and duration) using a neural network and machine learning techniques, the file type or the media file handle of the audio.

The classification instructions 246 may store the classification in the memory 110 so that other instructions on the computing device 240 may access the classification. In other examples, the classification may be stored as part of the metadata for the file, stream or application.

In another example, the classification instructions 246 may classify the audio based the operational environment of the playback device. In one example, an operational environment parameter may be the active application handling the audio session. In this example, if a YouTube® application is the application handling the audio session, the classification instructions 246 may classify the audio session as music or movie or voice based on the metadata available with the content being played, but if the Zoom® conferencing application is the application handling the audio session, the classification instructions 246 may classify the audio session as voice.

In a further example, the classification instructions 246 may classify the audio or audio session based on a machine learning analysis of metadata. One example of machine learning analysis of metadata may be found in International Patent Application Number PCT/US2019/049466, entitled "AUDIO SESSION CLASSIFICATION," that will be briefly described as follows.

In one example, the computing device 240 may determine the classification for the received far-end audio based on an analysis of metadata associated with the received far-end audio and a parameter of an operational environment of a playback device. An operational environment parameter may include the active application handling the audio session, a file handle being used, system events, etc.

The computing device 240 may load a file with a criterion or criteria, where the file indicates a classification based on a source. For example, the computing device 240 may load the file into memory. In some examples, the file may indicate associations or mappings between sources and classifications. In some examples, sources may be identified by process names and/or Uniform Resource Locators (URLs).

In some examples, the file may be a JavaScript Object Notation (JSON) file. The JSON file may include mappings from classifications (e.g., movie, music, and voice) to process names and URLs. For example, the mappings may include process names and website URLs that provide one type of media or audio session. In some examples, the file (e.g., JSON file) may be structured in a process portion and a URL portion. In some examples, the process portion may map a process name or names to a movie classification, a music portion that may map a process name or names to a music classification, and/or a voice portion that may map a process name or names (e.g., Lync®, Teams®, Zoom®, etc., or variants thereof) to a voice classification. In some examples, the URL portion may map a URL or URLs (e.g., netflix.com, www.amazon.com, www.vudu.com, etc., or variants thereof) to a movie classification, a music portion that may map a URL or URLs (e.g., music.amazon.com, www.pandora.com, www.spotify.com, etc., or variants thereof) to a music classification, a voice portion that may map a URL or URLs (e.g., www.audible.com, etc., or variants thereof) to a voice classification, and/or a classifier portion that may be utilized to call a machine learning model to perform classification for a URL or URLs (e.g., youtube.com, dailymotion.com, etc., or variants thereof) based on metadata. In some examples, the first classification stage may correspond to classifications from the movie, music, and voice portions of the process portion and the URL portion. In some examples, the second classification stage may correspond to the classifier portion.

The computing device 240 may monitor audio session activity using an application programming interface (API) 252. For example, the apparatus 102 may utilize an API or APIs of an operating system to monitor audio session activity. The API(s) may indicate when an audio session becomes active, inactive, or expired. An example of an API that may be utilized to monitor audio session activity is Win32. In some examples, an audio session may be activated by a process on the apparatus 102 (e.g., a process of a local application), where the process has a corresponding process name. In some examples, the audio session may be activated by a streaming website with a Uniform Resource Locator (URL). In some examples, an audio session may be active, inactive or expired. For instance, an audio session may become active when an application initiates streaming audio to a sound card. In some examples, an Operating System (OS) may notify a classification process to initiate classification when an audio session becomes active. In some examples, classification may be performed for active audio sessions.

The computing device 240 may determine whether the audio session is classifiable at a first classification stage. In some examples, determining whether the audio session is classifiable at the first classification stage may include determining whether the criterion or criteria indicate a classification for a source of the audio session. For example, when an audio session becomes active, the apparatus 102 may determine whether a source of the audio session is listed with a classification in the file at the first classification stage of the hierarchical classification model. In some examples, the source may be indicated by a process name or a URL. For instance, the apparatus 102 may identify the source with a process name and/or a URL associated with the audio session. The apparatus 102 may look up and/or search the criterion or criteria (e.g., the file) for the process name and/or URL at the first classification stage. The source may be indicated in a case that the process name or URL is included in the criterion or criteria at the first classification stage. The audio session may be classifiable at the first classification stage in a case that the source is indicated at the first classification stage. The audio session may not be classifiable at the first classification stage in a case that the source is not indicated at the first classification stage.

In response to determining that the audio session is classifiable at the first classification stage, the apparatus 102 may classify the audio session based on the criterion or criteria. For example, in a case that the criterion or criteria indicate a classification for the source of the audio session, the apparatus 102 may classify the audio session as a movie, music, or voice according to the classification of the criterion or criteria that matches the source (e.g., process name or URL). In an example, if a Microsoft® Teams call is initiated, the apparatus 102 may detect an active audio session and set the classification to voice in the first classification stage (without performing the second classification stage, for instance). In some examples, when an audio session becomes active, the apparatus 102 may determine whether a corresponding process or streaming site that activated the audio session is listed in the criterion or criteria of a JSON file. In some examples, the application name or the streaming site URL may be matched to the corresponding classification. In some examples, the apparatus 102 may use a surround sound setting in response to classifying the audio session as a movie, or a stereo setting in response to classifying the audio session as music, or monophonic (or stereo setting) in response to classifying the audio session as voice. In some examples, a classification or classifications from the first classification stage may be utilized to train a machine learning model. For example, the machine learning model may be continuously trained and/or updated after deployment.

In response to determining that the audio session is not classifiable at the first classification stage, the apparatus 102 may determine whether the audio session corresponds to a supported browser process. For example, the apparatus 102 may determine whether the process name associated with the audio session corresponds to a supported browser application (e.g., Internet Explorer®, Chrome®, Firefox®, Edge®, etc.). For instance, the apparatus 102 may look up and/or search for the process name in a set of process names corresponding to browser applications. The audio session may correspond to a supported browser process in a case that the process name is included in the set of process names corresponding to browser applications. The audio session may not correspond to a supported browser process in a case that the process name is not included in the set of process names corresponding to browser applications.

In response to determining that the audio session does not correspond to a supported browser process, the apparatus 102 may determine a media file handle corresponding to the audio session. For example, the apparatus 102 may obtain a list of open media file handles and identify a media file handle or handles corresponding to the audio session. In some examples, the media file handle(s) may be sent to a remote device (e.g., server) for improving classification.

The apparatus 102 may determine whether metadata is available. In a case that the audio session corresponds to a supported browser process, the apparatus 102 may download a page document using the URL and determine whether metadata associated with the audio session is included in the page document. In a case that the audio session does not correspond to a supported browser process, the apparatus 102 may utilize the media file handle to determine whether metadata is associated with the audio session.

In response to determining that metadata is not available, and if the process is a supported browser process, the apparatus may perform text analysis of a site. For example, the apparatus may analyze text from the page document to search for terms such as "movie," "film," "song," and/or other terms that may indicate whether the audio session corresponds to a movie, music, or voice. In some examples, the apparatus may classify the audio session based on the text analysis. In some examples, text terms may be extracted and/or utilized to classify the audio session in a case that metadata is not available. The apparatus may update the file. For example, the apparatus may add information (e.g., a URL) to the file (e.g., JSON file) that may be utilized to classify a subsequent audio session. In some examples, the text analysis may be sent to a remote device (e.g., server) for improving classification. In other examples, the apparatus may classify the audio session based on other types of analysis including, for example, an audio analysis.

In response to determining that metadata is available, the apparatus may extract the metadata. In some examples, the apparatus may read and/or store the metadata from the page document corresponding to the audio session. In some examples, the apparatus may read and/or store the metadata associated with the media file handle.

In some examples, metadata may include content-related descriptors in encoded music and visual media content (e.g., in Moving Picture Experts Group-4 (MP4) files or other files) that may be extracted by decoding the content or a portion of the content. In some examples, metadata may include two categories: a first category that describes how media is stored and a second category that describes the substance of the media. For example, the first category may include video/audio codec, content duration, video/audio bitrate, bit-depth, sample rate for audio, and/or frames/second (e.g., for moving pictures), etc. The second category may include language, title, artist (if applicable), album cover image, etc. Different containers may include different metadata descriptors. A container is a file that includes content (e.g., audio content and/or visual content) and metadata. While the metadata descriptors may be different between different containers (e.g., MP4, QuickTime Movie (MOV), Audio Video Interleave (AVI), etc.), some metadata descriptors may be included in a variety of containers. For example, some metadata descriptors may include content duration (e.g., running time or length of the content), sample rate (e.g., sample rate of audio), video presence (e.g., presence or absence of video), bit depth (e.g., audio bit depth), number of channels (e.g., audio channel count), video frame rate, etc. It may be beneficial to utilize a subset of available metadata to efficiently train a machine learning model. For example, a feature vector for the machine learning model may include content duration, sample rate, video presence, bit depth, and/or number of channels.

The apparatus 102 may classify the audio session as a movie, music, or voice based on a machine learning model. For example, the apparatus 102 may provide the metadata to the machine learning model, which may produce a classification of the audio session as a movie, music, or voice. In some examples, the machine learning model may be trained with content metadata. For example, the machine learning model may have been previously trained using training metadata, where the training metadata includes content duration, sample rate, video presence, bit depth, and/or number of channels, etc. In some examples, the machine learning model may be periodically, repeatedly, and/or continuously updated and/or trained (with results and/or user feedback corresponding to the first classification stage and/or the second classification stage).

The apparatus 102 may use a surround sound setting in response to classifying the audio session as a movie. For instance, in a case that the audio session is classified as a movie, the apparatus 102 may use a surround sound setting. In some examples, using a surround sound setting may include processing and/or presenting the audio session using synthetic surround sound. For instance, the apparatus 102 may up mix the audio session to more than two channels and/or present the audio using more than two speakers.

The enabling instructions 216 may automatically enable inbound noise removal for the audio when the type is classified as a voice. The enabling instructions 216 may be automatic in that they do not prompt for user input in order to have the noise removal enabled.

The disabling instructions 248 may automatically disable the inbound noise removal when the audio type is classified as not voice. More specific examples of a not voice classification include declassification as music or as a video. The disabling instructions 248 may be automatic in that they do not prompt for user input in order to have the noise removal disabled.

Visual classification instructions 250 may analyze video that is part of the audio session and make a determination if a user is speaking through visual analysis. If the visual classification instructions 250 determine that a user is speaking, then the type of audio may be set to voice. If the visual classification instructions 250 determine that a user is not speaking, then the type of audio may be set to not voice, such as music or video. For instance, if there is a meeting participant playing a musical instrument (i.e. guitar), the inbound noise cancelling should be disabled so that the sound can go through.

Noise removal instructions 256 may be instructions that remove noise from the inbound audio from a remote computing device 220. For example, the noise removal instructions 256, when enabled, may automatically perform inbound noise removal. Some examples of applications that include noise removal instructions 256 are the Nvidia® RTX Voice application, the Nvidia® Broadcast Application, and the Krisp® application. An application programming interface (API) 252 may be provided that enables the noise removal instructions 256 to be executed through an API 252 call. For example, the Nvidia® RTX Voice application, the Nvidia® Broadcast Application, and/or the Krisp® application may provide an API through which inbound noise removal instructions 256 may be executed.

The computing device 240 may also include system events 254 that may be used to enable or disable the noise removal instructions 256. For example, a system event 254 may be raised in order to cause the noise removal instructions 256 to be executed.

Figure 3:
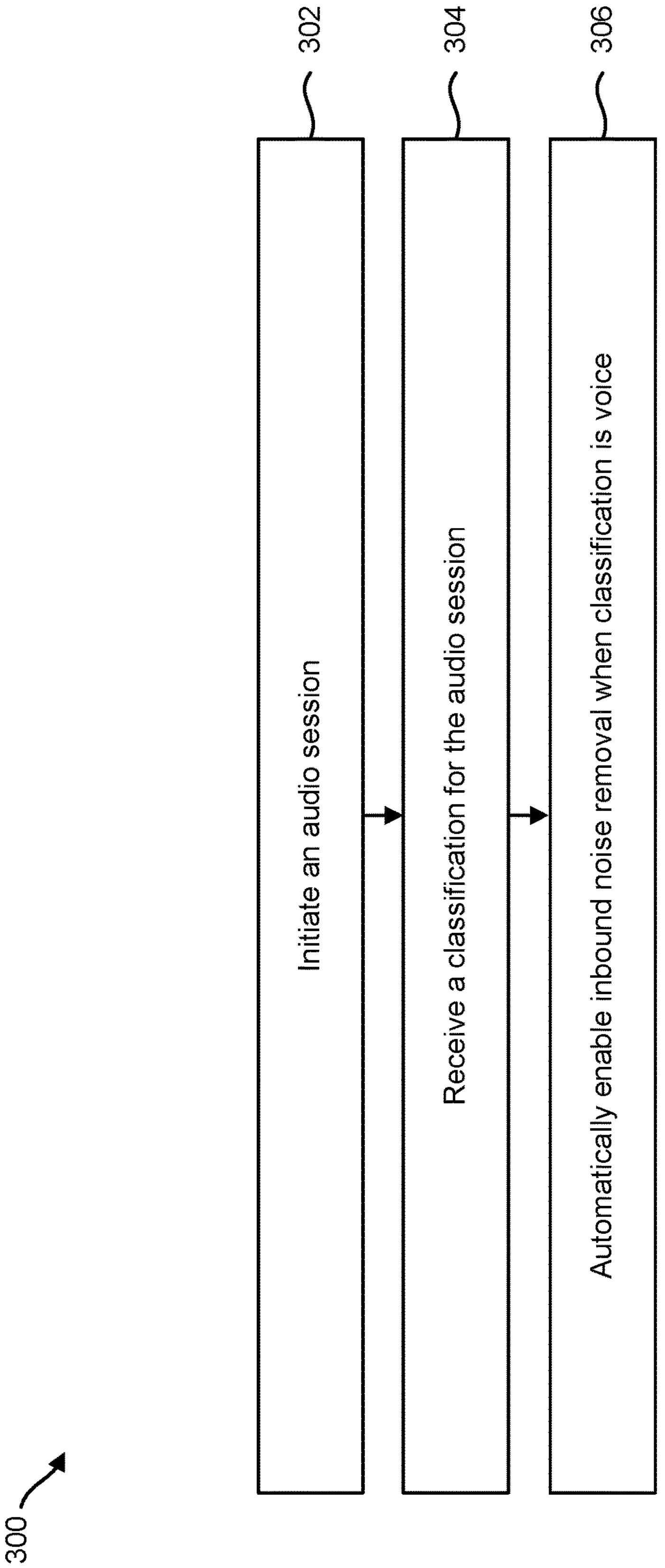
FIG. 3 is a flow diagram illustrating an example of a method for noise removal on an electronic device.

FIG. 3 is a flow diagram illustrating an example of a method 300 for noise removal on an electronic device. The method 300 and/or a method 300 element(s) may be performed by an electronic device. An audio session may be initiated 302. A classification for the audio session may be received 304. The classification may be received 304 from the classification instructions 246. The classification instructions 246 may store the classification in memory that may be accessed by other instructions. The classification may be stored in metadata associated with the file, stream or program. The classification may be communicated via the API 252 or through a system event 254. When the classification is voice, inbound noise removal may be automatically enabled 306.

Figure 4:
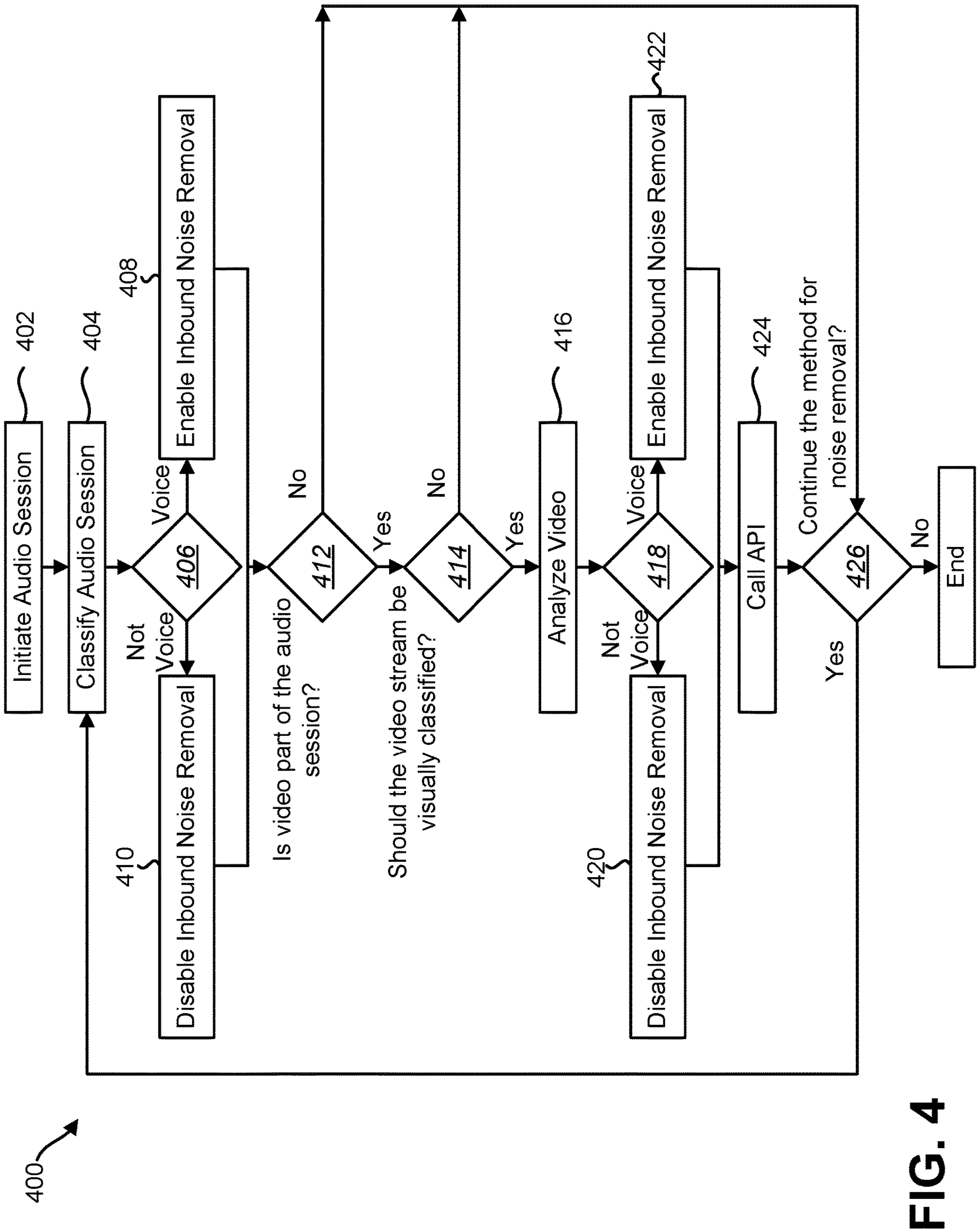
FIG. 4 is a flow diagram illustrating an example of a method for noise removal on an electronic device.

FIG. 4 is a flow diagram illustrating an example of a method 400 for inbound noise removal on a computing device 240. The method 400 and/or a method 400 element(s) may be performed by a computing device 240.

At 402, an audio session may be initiated. The computing device 240 may classify 404 the audio session, such as via execution of classification instructions by a processor resource of the computing device 240. In classifying 404 the audio session, the computing device 240 may determine whether the audio session is voice or not voice. In some examples, when the audio session is not voice it may be further classified as music or video.

At 406, the computing device 240 may automatically enable 408 inbound noise removal when the classification is voice. If the classification is not voice, the device may automatically disable 410 inbound noise removal.

At 412, it is determined whether video is part of the audio session. If video is part of the audio session, it is determined 414 whether the video stream should be visually classified. A visual classification may be a second classification. The second classification may be used to override a first classification.

If the video stream is to be visually classified, the video is analyzed 416 to determine whether the video includes a user speaking, or whether the video includes a user that is not speaking. In one example, a user that is not speaking may be a user playing a musical instrument. If it is determined 418 that the user is not speaking in the video, then the device may automatically disable 420 inbound noise removal. If it is determined 418 that the video is of a user speaking, then the device may automatically enable 422 inbound noise removal.

The computing device 240 may then make a call 424 to an Application Programming Interface (API) 252 or may raise a system event to cause the setting of the inbound noise removal to be processed by the instructions for performing inbound noise removal. When the inbound noise removal is enabled, the device may perform inbound noise removal.

At 426 it is determined whether to continue the method 400 for noise removal on a computing device 240. If it is determined 426 to continue, the method may return to 404. If the method 400 determines 426 it should not continue, the method 400 may end.

Figure 5:
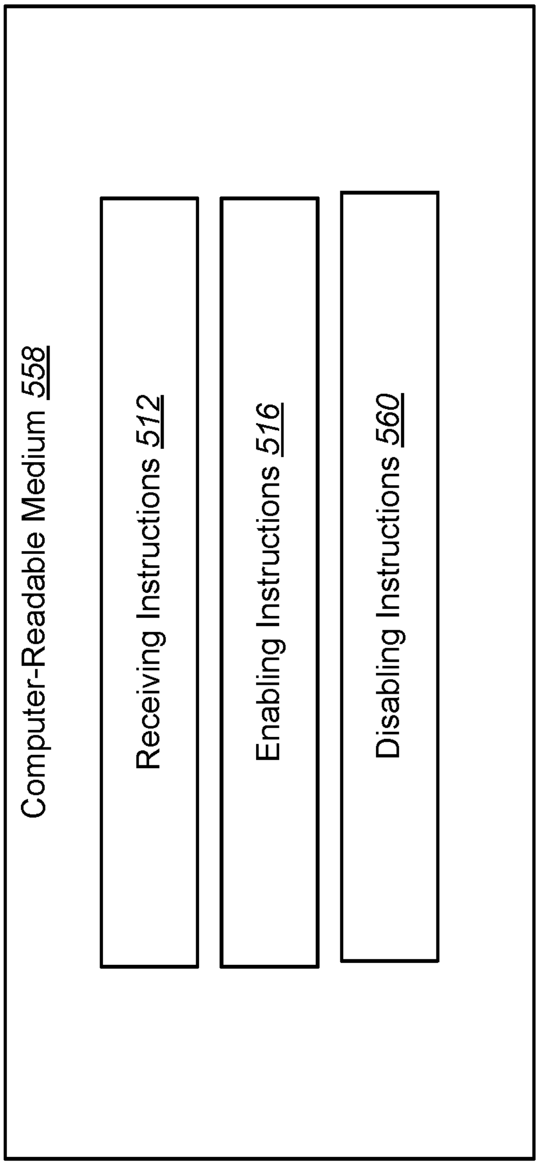
FIG. 5 is a block diagram illustrating an example of a computer-readable medium noise removal on an electronic device.

FIG. 5 is a block diagram illustrating an example of a computer-readable medium 558 for noise removal on a computing device 240. The computer-readable medium 558 may be a non-transitory, tangible computer-readable medium. The computer-readable medium 558 may be, for example, RAM, EEPROM, a storage device, an optical disc, and/or the like. In some examples, the computer-readable medium 558 may be volatile and/or non-volatile memory, such as DRAM, EEPROM, MRAM, PCRAM, memristor, flash memory, and/or the like. In some examples, the computer-readable medium 558 may be included in a computing device 240, an electronic device and/or may be accessible to a processor 208 of a computing device 240 or electronic device. In some examples, the computer-readable medium 558 may be an example of the memory 110 and 210 described in relation to FIGS. 1 and 2.

The computer-readable medium 558 may include data, executable instructions, and/or executable code. For example, the computer-readable medium 558 may include receiving instructions 512, enabling instructions 516, and disabling instructions 560.

The receiving instructions 512 may be instructions that when executed cause a processor 108 to receive a classification for received far-end audio classifying the far-end audio as voice or not voice. The enabling instructions 516 may cause the processor 108 to automatically enable inbound noise removal for the received far-end audio when the classification is voice. The disabling instructions 560 may cause the processor 108 to automatically disable inbound noise removal for the received far-end audio when the classification is not voice.

A technique or techniques, a method or methods (e.g., method(s) 300 and/or 400) and/or an operation or operations described herein may be performed by (and/or on) an electronic device and/or a computing device. In some examples, an electronic device and/or a computing device may include circuitry (e.g., a processor 108 with instructions and/or connection interface circuitry) to perform a technique or techniques described herein.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, aspects or elements of the examples described herein may be omitted or combined.

The invention claimed is:

1. A method, comprising:

initiating, at a computing device, an audio session of an incoming video stream;

receiving, at the computing device, a classification for the audio session of the incoming video stream;

automatically enabling, at the computing device, inbound noise removal when the classification is spoken voice, wherein the classification is determined after analyzing the video stream;

receiving, at the computing device, first audio of the incoming video stream having first noise from a remote computing device;

removing, at the computing device, the first noise from the first audio to generate filtered first audio in response to the automatic enabling of inbound noise removal; and playing, using an audio interface of the computing device, the filtered first audio.

2. The method of claim 1, further comprising automatically disabling the inbound noise removal when the classification is not spoken voice.

3. The method of claim 1, wherein the classification is determined based on a file type.

4. The method of claim 1, wherein the classification is determined based on an application handling the audio session.

5. The method of claim 1, wherein the classification is determined based on a machine learning analysis of metadata.

6. The method of claim 1, wherein the classification is a first classification further comprising determining, at the computing device, that a user is speaking in the video stream; and wherein automatically enabling, at the computing device, inbound noise removal is based on determining that the user is speaking in the video.

7. The method of claim 1, wherein removing the first noise from the first audio to generate filtered first audio in response to the automatic enabling of inbound noise removal includes calling an application programming interface (API) to cause the setting of the inbound noise removal.

8. The method of claim 1, wherein receiving the classification for the audio session includes:

determining the classification for the audio session is based on at least one of metadata, number of audio channels, sample rate, bit resolution, bit duration, or operational environment parameter.

9. The method of claim 1, wherein receiving the classification for the audio session includes:

using a machine learning model to provide the classification.

10. The method of claim 1, further comprising receiving the classification for the audio session of the incoming video stream by analyzing the video stream.

11. The method of claim 1, wherein the classification is a final classification of the incoming video stream and further comprising:

analyzing audio of the audio session to determine a first classification of the video stream, the first classification being not spoken voice;

visually classifying the video of the video stream to determine a second classification of the video stream, the second classification being spoken voice; and determining the final classification of the video stream being spoken voice, based on the second classification being spoken voice, the second classification overriding the first classification.

12. An apparatus, comprising:

an audio interface;

a network interface; and a processor to:

receive an incoming video stream including audio from the network interface;

determine a type of the audio;

automatically enable noise removal for the audio when the type is spoken voice, wherein the type of the audio is determined after analyzing the incoming video stream;

perform noise removal on the audio to generate filtered audio, after noise removal has been automatically enabled; and play the filtered audio using the audio interface.

13. The apparatus of claim 12, wherein the processor is to further join an online call, and wherein the received audio is part of the online call.

14. The apparatus of claim 12, wherein the automatic enabling of the noise removal is accomplished without user input.

15. The apparatus of claim 12, wherein the processor is to automatically disable noise removal for the audio when the type is not spoken voice.

16. The apparatus of claim 12, further comprising receiving a classification for the audio session of the incoming video stream by analyzing the incoming video stream.

17. The method of claim 1, further comprising calling an application programming interface (API) to cause the setting of the noise removal.

18. A non-transitory tangible computer-readable medium comprising instructions when executed cause a processor to:

automatically enable inbound noise removal for received far-end audio of an incoming video stream when a classification of the received far-end audio is spoken voice, wherein the classification is determined after analyzing the incoming video stream;

receive first audio of the incoming video stream having first noise from a remote computing device;

remove the first noise from the first audio to generate filtered first audio in response to the automatic enabling of inbound noise removal;

play, using an audio interface, the filtered first audio; and automatically disable inbound noise removal for the received far-end audio when the classification is not spoken voice.

19. The non-transitory tangible computer-readable medium of claim 18, wherein the processor is to:

determine the classification for the received far-end audio based on an analysis of metadata associated with the received far-end audio and a parameter of an operational environment of a playback device.

20. The non-transitory tangible computer-readable medium of claim 18, wherein the instructions cause the processor further to receive the classification for an audio of the incoming video stream by analyzing the incoming video stream.

* * * * *